United States Patent [19]

Vaidya et al.

[11] Patent Number: 5,446,078
[45] Date of Patent: Aug. 29, 1995

[54] BIODEGRADABLE COMPOSITIONS PRODUCED BY REACTIVE BLENDING OF SYNTHETIC AND NATURALLY OCCURRING POLYMERS

[75] Inventors: Utpal R. Vaidya, Inver Grove Heights; Mrinal Bhattacharya, Vadnais Heights, both of Minn.

[73] Assignee: Regents of the University of Minnesota, Minneapolis, Minn.

[21] Appl. No.: 207,840

[22] Filed: Mar. 8, 1994

Related U.S. Application Data

[62] Division of Ser. No. 881,983, May 12, 1992, Pat. No. 5,321,064.

[51] Int. Cl.$^6$ .......................... C08L 89/00; C08L 3/00
[52] U.S. Cl. .......................................... 524/17; 524/23; 524/25; 524/26; 524/47; 523/124; 526/238.1; 526/238.22
[58] Field of Search .................. 524/17, 18, 47, 23, 524/25, 26; 523/124; 526/238.1, 238.22

[56] References Cited

U.S. PATENT DOCUMENTS

| | | | |
|---|---|---|---|
| H1032 | 3/1992 | Arnold et al. | 527/313 |
| 2,548,520 | 4/1951 | Damschroder et al. | 526/238.1 |
| 3,095,391 | 6/1963 | Brockway et al. | 260/17.4 |
| 3,518,176 | 6/1970 | Reyes et al. | 204/159.12 |
| 3,985,616 | 10/1976 | Weaver et al. | 524/18 |
| 4,016,117 | 4/1977 | Griffin | 260/17.4 |
| 4,133,784 | 1/1979 | Otey et al. | 260/17.4 |
| 4,243,564 | 1/1981 | Mavis | 260/17.4 |
| 4,337,181 | 6/1982 | Otey et al. | 523/128 |
| 4,607,089 | 8/1986 | Riley et al. | 527/201 |
| 4,638,024 | 1/1987 | Sato et al. | 524/17 |
| 4,675,009 | 6/1987 | Hymes et al. | 604/304 |
| 5,087,650 | 2/1992 | Willett | 524/47 |
| 5,095,054 | 3/1992 | Lay et al. | 524/47 |
| 5,115,000 | 5/1992 | Jane et al. | 524/47 |

FOREIGN PATENT DOCUMENTS

| | | |
|---|---|---|
| 0409782 | 1/1991 | European Pat. Off. . |
| 409788 | 1/1991 | European Pat. Off. . |
| 0409788 | 1/1991 | European Pat. Off. . |
| 55-42200 | 3/1980 | Japan . |
| 55-157643 | 12/1980 | Japan . |
| 61-56359 | 3/1986 | Japan . |
| 1495845 | 12/1977 | United Kingdom . |
| 2009762 | 6/1979 | United Kingdom . |
| WO91/02025 | 2/1991 | WIPO . |
| WO91/02757 | 3/1991 | WIPO . |

OTHER PUBLICATIONS

Bagley et al., "Graft Copolymers of Polysaccharides with Thermoplastic Polymers. A New Type of Filled Plastic", *Poly. Eng. Sci.*, 16:311–316 (May 1977).

Brockway, "Copolymerization of Methyl Methacrylate with Unsaturated Esters of Granular Starch", *J. Poly. Sci.*, 3:1031–1036 (1965).

Cimmino et al., "Morphology—Properties Relationships in Binary Polyamide 6/Rubber Blends: Influence of the Addition of a Functionalized Rubber", *Poly. Eng. Sci.*, 24:48–56 (Jan. 1984).

Cimmino et al., "Ternary Nylon–6/Rubber/Modified Rubber Blends: Effect of the Mixing Procedure on Morphology, Mechanical and Impact Properties", *Polymer*, 27:1874–1884 (Dec. 1986).

Erickson, "How to Make Biodegradable Bags", *Plastics World*, 47:61–63 (May 1989).

(List continued on next page.)

*Primary Examiner*—Paul R. Michl
*Assistant Examiner*—LaVonda R. DeWitt
*Attorney, Agent, or Firm*—Merchant, Gould Smith, Edell, Welter & Schmidt

[57] ABSTRACT

A biodegradable interpolymer and composition is prepared by the reactive blending of a synthetic polymer having functional groups with a naturally occurring biodegradable polymer such as a carbohydrate or protein compound. During reactive blending, the synthetic polymer can undergo a chemical reaction with the biodegradable natural polymer which results in covalent and physical bonding between the two polymers, thereby forming an interpolymer. By this process, a biodegradable interpolymer composition is produced that is suitable for molding various articles.

21 Claims, No Drawings

OTHER PUBLICATIONS

Fanta et al., "Composite of Starch and Poly(ethylene-co-acrylic acid). Complexing Between Polymeric Components", *J. Appl. Polymer Sci.*, 40:811–821 (1990).

Gaylord, "Compatibilizing Agents: Structure and Function in Polyblends", *J. Macromol. Sci.—Chem.*, A26(8):1211–1229 (1989).

Liu et al., "Reactive Polymers for Blend Compatibilization", *Advances in Poly. Tech.*, 11:249–262 (1992).

Maddever et al., "Modified Starch-Based Biodegradable Plastics", *Plastics Engineering*, at pp. 31–34 (Jul. 1989).

Otey et al., "Starch-Based Blown Films", *I&EC Product Research & Development*, 19:592–595 (Dec. 1980).

Otey et al., "Starch-Based Films. Preliminary Diffusion Evaluation," *I&EC Product Research & Development*, 23:284–287 (Jun. 1984).

Otey et al., "Starch-Based Blown Films. 2," *Ind. Eng. Chem. Res.*, 26:1659–1663 (1987).

Willett, "Starch-Based Masterbatches for Polyolefin Applications", *Corn Utilization Conf. IV*, St. Louis, Mo., at pp. 1–3 (Jun. 24–26, 1992).

Gaylord, "Compatibilizing Agents: Structure and Function in Polyblends," J. Macromol. Sci.-Chem., A26(8) pp. 1211–1229 (1989).

Otey et al., "Starch-Based Films. Preliminary Diffusion Evaluation," I&EC Product Research & Development, vol. 23., No. 2, pp. 284–287 (1984).

Maddever et al., "Modified Starch-Based Biodegradable Plastics," Plastics Engineering, pp. 31–34 (Jul. 1989).

Erickson, "How to Make Biodegradable Bags," Plastics World, vol. 47, No. 5; pp. 61–63 (May 1989).

BIODEGRADABLE COMPOSITIONS PRODUCED BY REACTIVE BLENDING OF SYNTHETIC AND NATURALLY OCCURRING POLYMERS

This invention was made with U.S. Government support under Grant No. 90-34193-5163 awarded by the U.S. Department of Agriculture. The U.S. Government has certain rights in the invention.

This is a division, of application Ser. No. 07/881,983, filed May 12, 1992 now U.S. Pat. No. 5,321,064.

FIELD OF THE INVENTION

The invention relates generally to biodegradable polymers. More particularly, the invention relates to biodegradable interpolymers and compositions made therefrom produced by reactive blending of synthetic and naturally occurring polymers. The synthetic polymers have functional groups thereon, and the natural polymers can include various biodegradable polymers such as carbohydrates, proteins, lipids or the like.

BACKGROUND OF THE INVENTION

Synthetic polymers are increasingly replacing conventional materials like metal, wood, glass and paper because of their excellent mechanical properties, as well as chemical and weather resistance. However, these very properties make such polymers nonbiodegradable, and as a result, a large amount of plastic waste is accumulating in landfills, causing severe pollution. The burden of accumulating plastic waste has led to a growing interest in the development of biodegradable plastics. The environmental movement in advanced countries generally supports the idea that plastics used in packaging and other discardable containers should be biodegradable. For many biomedical, agricultural, and ecological uses, it is preferable to have a biodegradable polymer that will undergo degradation in the physiological environment or by microbial action in the soil.

Although the use of petroleum-based plastics continues to grow, limited oil reserves and the effect of plastics on the environment has generated a need for degradable plastics based on renewable sources like cereal grains or cellulose, since most synthetic plastics are resistant to microbiological attack. Many plastic articles contain biopolymers including starch or cellulose based additives such as fillers, extenders and reinforcing agents. However, the amount of biopolymer currently being used in plastics is relatively small and would account for a minor fraction of a percent of the total plastics produced.

Most synthetic (petroleum-based) polymers and natural polymers such as polysaccharides and proteins are immiscible at the molecular level. Prior researchers have used graft copolymers of starch and vinyl monomers to develop biodegradable blends. In this type of reaction, the vinyl monomer is grafted onto the starch backbone. The most common method of grafting is the free radical initiation technique, including initiation by chemical methods and initiation by irradiation. The addition of block copolymers as a compatibilizer has also been utilized, however, block copolymers in general are expensive and those from polysaccharides are difficult to synthesize.

Petroleum-based plastics can be made biodegradable by the incorporation of some carbohydrates. For example, Griffin, U.S. Pat. No. 4,016,117, discloses a biodegradable composition including a synthetic resin, a biodegradable granular filler such as starch, and a substance which is auto-oxidizable to yield a peroxide which attacks the carbon linkages in the resin. Otey, et al., U.S. Pat. No. 4,133,784 discloses biodegradable film compositions prepared from starch and ethylene acrylic acid copolymers. Brockway et al., U.S. Pat. No. 3,095,391 discloses a process to graft vinyl monomers like styrene onto starch using redox systems. Reyes, et al., U.S. Pat. No. 3,518,176 discloses a process for grafting a vinyl monomer onto starch in which the reaction is catalyzed by radiation or ceric ions.

In other processes of combining natural and synthetic polymers, the components are treated severely to produce various compositions. For example, Chinnaswami, PCT Publication No. WO 91/02757 discloses biodegradable polymers which are prepared by treating biodegradable materials such as starches and petroleum-based plastics with heat, pressure, and reagents, resulting in oxidative degradation of the polymers to small fragments of polymers which can react to form graft and block copolymers. Lay, et al., U.S. Pat. No. 5,095,054 discloses a polymer composition containing destructurized starch and at least one thermoplastic polymer which can have functional groups which is prepared by mixing the components under heat and pressure to produce a homogeneous melt mixture.

The technique of blending incompatible well-known synthetic polymers to produce "new" polymers has grown in importance in the synthetic polymer industry. Such methods have been increasingly used to obtain products of any wide range of properties rather economically. The performance of polymer blends is dependent on the interfacial interactions and the size and shape of the phases. There are two major methods of achieving interfacial control. The first is the addition of a copolymer in the blend mixture. The compatibilizing action of block copolymers is similar to the emulsifying effect of surfactants in oil and water mixtures. Reactive blending using various reacting groups is the second method of obtaining interfacial control. The final properties of the blend depend on the morphology, extent of reaction, and interfacial characteristics in the blend.

Biopolymers are difficult to mold in their natural form. For example, products made totally from starch are brittle and inflexible and thus unsuitable for most purposes. Biopolymers and plastics are incompatible when blended so that they do not mix easily and new materials prepared from these two incompatible polymers result in products that display reduced physical properties. This is due to a high interfacial tension and poor adhesion between starch and plastic phases. The high interfacial tension contributes, along with high viscosities, to the inherent difficulty of imparting the desired degree of dispersion to random mixtures. This leads to their subsequent lack of stability, to gross separation, or to stratification during later processing or use. Poor adhesion leads, in part, to very weak and brittle mechanical behavior.

Therefore, there is a need for an improved biodegradable polymer material which combines the desirable properties of plastics with significant biodegradability such that a product buried in the soil will degrade to destruction. Products in accordance with the present invention will make a significant contribution to the environment by reducing the disposal problem caused by chemically inert and bulk plastics.

SUMMARY OF THE INVENTION

The present invention is directed to novel biodegradable interpolymers and compositions made therefrom. The biodegradable interpolymer includes an effective biodegradable amount of a natural polymer such as a carbohydrate or protein compound, and a synthetic polymer having at least one functional group. The functional group reacts with the natural polymer, such as with a hydroxyl group of the carbohydrate or an amine group of the protein, thereby covalently bonding the synthetic polymer to the natural polymer to form the novel interpolymer.

A novel biodegradable composition containing the interpolymers of the invention comprises about 5 to 99 wt-% of a natural polymer such as a carbohydrate or protein or both, and about 1 to 95 wt-% of a synthetic polymer having at least one functional group. The natural and synthetic components are present in the composition as either a continuous phase or a dispersed phase. The continuous phase is the major component and the dispersed phase is the minor component. The natural polymer and synthetic polymer chemically or physically bond at the interface between the continuous phase and the dispersed phase, thereby producing the interpolymers which provide a strong interaction between the continuous phase and the dispersed phase of the composition of the invention.

The novel biodegradable interpolymer and composition is prepared by reactive blending of the synthetic polymers having functional groups and natural polymers at an elevated temperature. During reactive blending, the functional group of the synthetic polymer reacts with the natural polymer, thereby physically or covalently bonding the synthetic polymer to the natural polymer to form the interpolymer of the invention. By the process of the invention, a biodegradable interpolymer composition containing up to 99 wt-% of a biodegradable component can be made which is suitable for molding various articles.

The reactive blending of the polymers can be performed in any reaction type vessel suitable for reactive blending to produce the interpolymer and composition of the invention. The synthetic polymers, such as petroleum-based polymers, can include polystyrene, polyethylene, polypropylene, polyurethane, polyesters, polyamides, etc., and the natural polymers can include carbohydrates, proteins and lipids. The functional groups can be present in the backbone or as a side chain of the synthetic polymer. Various functional groups can also be present on the natural polymer such as in modified starches.

One aspect of the invention is a novel, biodegradable interpolymer formed from various synthetic polymers and natural biodegradable polymers. A further aspect of the invention is a novel biodegradable interpolymer composition including a continuous phase and a dispersed phase. Another aspect of the invention is a method for the preparation of the novel biodegradable interpolymer and composition by reactive blending. A further aspect of the invention includes articles produced from the biodegradable interpolymer composition.

DETAILED DESCRIPTION OF THE INVENTION

The present invention is based upon the discovery that a novel biodegradable interpolymer and composition made therefrom can be prepared by reactive blending of naturally occurring biodegradable polymers with synthetic polymers having reactive functional groups. The natural biodegradable polymers can include carbohydrates, proteins, lipids or the like, and the synthetic polymers can be selected from various plastic forming materials. The functional group can be any reactive group of the synthetic polymer that will react with the natural polymer thereby covalently bonding the synthetic polymer to the natural polymer to form the novel interpolymer.

In the present invention, we believe that the natural and synthetic components are present in the biodegradable composition as either a continuous phase or as a dispersed phase. The continuous phase is the major component and the dispersed phase is the minor component. For example, when the natural polymer is the major component it is considered to be in a continuous phase, whereas the synthetic polymer would be the dispersed phase. During reactive blending, the natural polymer and synthetic polymer having functional groups chemically or physically bond at the interface between the continuous phase and the dispersed phase thereby forming a plurality of interpolymers which effectively provide a strong interaction between the continuous phase and the dispersed phase. For example, the functional group is any reactive group of the synthetic polymer that will react with a hydroxyl group of a carbohydrate compound or an amine group of a protein, thereby covalently bonding the synthetic polymer to the carbohydrate or protein compound at the interface between the continuous phase and the dispersed phase. Thus, the composition of the invention is different from prior compositions which are homogeneous or nonhomogeneous mixtures of various natural and synthetic polymer components that do not react with each other.

In the biodegradable interpolymer composition of the invention, the dispersed phase comprises a plurality of particulate microdomains having a diameter of about 0.01 to 100 microns. Also, about 1 to 99% of the functional groups of the synthetic polymer of the composition are chemically or physically bonded to the natural polymer such as a carbohydrate or protein.

Naturally Occurring Polymers

A variety of naturally occurring biodegradable materials can be employed in producing the biodegradable interpolymer and composition of the invention. Such natural polymer materials include carbohydrates such as starch and cellulose, lignin, proteins, nucleic acids, amino acids, and lipids, which are all biodegradable. These natural polymers can be used either separately or in various mixtures in formulating the interpolymer and composition of the invention. The above natural polymers can be derived from corn, wheat, potato, sorghums, tapioca, rice, arrow root, sago, soybean, pea, sunflower, peanut, gelatin, milk, eggs, etc.

One preferred biodegradable class of materials is the carbohydrates. The saccharides or sugars are a group of organic compounds related by molecular structure that comprises simpler members of the general class of carbohydrates. Each sugar consists of a chain of two to seven carbon atoms (usually 5 or 6). One of the carbons carries aldehydic or ketonic oxygen which may be combined in acetal or ketal forms and the remaining carbon atoms usually bear hydrogen atoms and hydroxyl groups. The carbohydrate sugars useful in the invention include monosaccharides such as glucose, fructose, saccharose, and the like; disaccharides such as lactose, maltose and sucrose; oligosaccharides; and polysaccharides like gums, starch, cellulose, etc. As used in the present specification, the term "oligosaccharide" denotes a sugar polymer of from 3 to 15 units, and a higher sugar polymer having more than 10 units is designated as a "polysaccharide." The carbohydrate component employed in the present invention can also comprise various derivatives of the above sugars, preferably ester or ether derivatives of the sugars.

The general formula for the preferred carbohydrates is as follows:

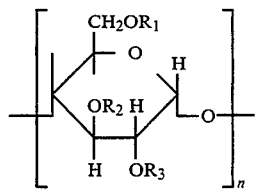

wherein the moieties $R_1$, $R_2$ and $R_3$ can be hydrogen, alkyl, hydroxy alkyl, phenyl, ester, ether, a monosaccharide or polysaccharide substitution, and n represents any number of repeating units.

A preferred carbohydrate employed in the present invention is a polysaccharide. Polysaccharides are widely distributed in the plant and animal worlds, serving as a food reserve substance and structural material. Suitable polysaccharides include starch and cellulose, which consist of D-glucopyranosyl units linked by alpha and beta-1,4 bonds, respectively.

Starch is a particularly preferred polysaccharide for use in the invention. Starches are polysaccharide compounds which on hydrolysis produce sugars. Starch can include a mixture of linear (or amylose) and branched (or amylopectin) components. Amylose has a molecular weight of several hundred thousand, while amylopectin has a molecular weight in the order of several million. Starches containing 0 to 100% amylose or 0 to 100% amylopectin can be employed in the invention. Any form of starch can be used in the present invention, including gelatinized starches, ungelatinized starches, substituted starches, chemically modified starches, crosslinked starches and unmodified starches. A variety of functional groups discussed in more detail below may be attached to the above starches. High amylose starches such as "Amalean-1" supplied by American Maize Products Company, and industrial corn starch such as "Silver Medal Pearl-1100 (SMP-1100) supplied by Cargill Inc. are suitable starches for use in the invention.

Proteins may also be utilized in the present invention. Proteins are nitrogen organic compounds of high molecular weight from about 3000 to many millions. Proteins are made up of complex combinations of simple amino acids, and they occur in all animal and vegetable matter. The constituent amino acids of the protein molecule are linked together with a peptide bond and the linkage forms the backbone of the molecule. Suitable proteins that may be utilized in the present invention include egg proteins, milk proteins, animal proteins, vegetable proteins and cereal proteins. Examples of proteins which can be utilized in the present invention include isolated soy proteins such as "Supro 90", "Supro HD90", and "Supro 500E", which contain 90% protein and are supplied by Protein Technologies International.

Natural materials which contain both protein and starch can also be utilized in the present invention. Wheat flour, such as "ICPS RED" and "ICWRS" which contain about 20% protein and about 70% starch, is such a suitable material.

Lipids may also be utilized in the present invention. Lipids or fats are natural combinations of glycerin with fatty acids, known as triglycerides. Lipids are derived from animal or vegetable sources, the latter source being chiefly the seeds or nuts of plants. Suitable lipids that may be utilized in the present invention include fats derived from vegetable sources such as oil seeds.

The natural polymers employed in the present invention act as a source of nutrient for microbes. This creates an environment favorable to the growth of the microorganism which results in degrading of the composition of the invention with time. As the concentration of natural polymer such as starch or proteins is increased in the composition, the biodegradability of the composition is also increased. Biodegradability is the ability of a material to breakdown as a result of the action of living microorganisms such as bacteria and fungi, and the enzymes which are substances intermediate in their metabolic processes. Biodegradation thus occurs in environments where such microorganisms are present. Typically, biodegradation occurs in an object which is in contact with soil, buried or partially buried. A biodegradable composition gradually loses mechanical strength and decomposes.

The naturally occurring polymer such as a carbohydrate or protein is present in the composition of the invention in an amount of about 5 to 99 wt-%, preferably about 10 to 90 wt-%, and in particular about 30 to 80 wt-%.

Synthetic Polymers

The naturally occurring biodegradable polymers are reactively blended with synthetic polymers having functional groups to form the interpolymer and composition of the invention. The synthetic polymers can be selected from various nonbiodegradable plastic forming materials. Such synthetic polymers can be based upon polyolefins such as polystyrene, polyethylene, polypropylene, polybutadiene, and polyisoprene. Other suitable synthetic polymers can be based upon or include saturated dienes, polyvinyl chloride, polyesters, polyamides, polyacrylates, polyurethanes, polyurea, polyethers, various rubbers, polycarbonates, polylactides, etc. Various random, block and graft copolymers of the above polymers, and mixtures of the above polymers can also be utilized in the invention.

The functional groups can be present in the backbone or as a side chain on the synthetic polymer or can be added as a substituent thereof. The functional groups can include primary, secondary, and tertiary amines, anhydrides such as the anhydride of a dicarboxylic acid, oxazoline, epoxy, hydroxy, isocyanate, carboxylic acid, acid chloride, aldehydes, ketones, acyl halides, alkyl halides, nitrile, nitro, thiols, esters, ethers, alkoxy, urethanes, urea, carbodiimide, amides, etc. Preferably, the functional groups are preattached to the synthetic polymers prior to blending with the natural polymers. Each of these functional groups can react with the other kind of functional groups listed above, or in some cases with its same kind of functional group to form one or more chemical or physical bonds between the natural and synthetic polymers;

An example of a general formula for a preferred synthetic polymer with a anhydride functional group on the backbone of the polymer which can be used in formulating the interpolymer and composition of the invention is as follows:

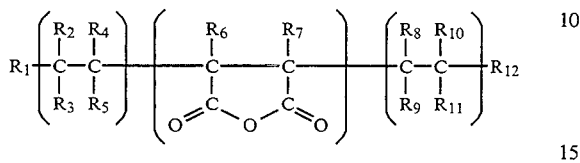

wherein the moieties $R_1$ through $R_{12}$ can be hydrogen, halogen, alkyl, phenyl, alkoxy, ether, ester, or various other groups. A general formula for a preferred synthetic polymer having a anhydride group on a side chain of the polymer is as follows:

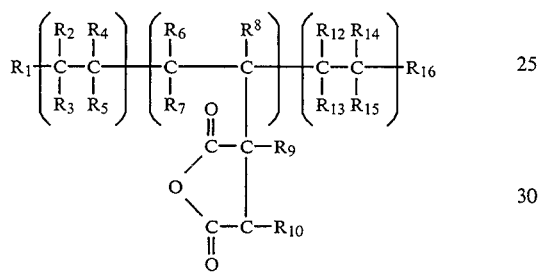

wherein the moieties $R_1$ through $R_{16}$ can be hydrogen, halogen, alkyl, phenyl, alkoxy, ether, ester, or various other groups.

The functional group such as an anhydride can be introduced into the nonbiodegradable synthetic polymer via grafting or copolymerization of the synthetic monomer with unsaturated dicarboxylic anhydrides like maleic anhydride. The anhydride functionality can also be achieved by reacting the synthetic monomer with trimellitic anhydride or pyromellitic anhydride. Preferred synthetic polymers which can be utilized in the invention include functionalized polystyrene such as styrene-maleic anhydride copolymer (Dylark-232) which can be obtained from ARCO Chemical Company, and a maleated ethylene-propylene copolymer (Exxelor VA-1801) supplied by Exxon Chemical Company. The reactive functional groups in these polymers can be present in the backbone or as a side chain.

The synthetic polymer can be present in the composition of the invention in an amount of about 1 to 95 wt-%, preferably about 10 to 90 wt-%, and in particular about 20 to 70 wt-%.

Reaction Equations and Products

The possible chemical reactions between an anhydride functional synthetic polymer and a carbohydrate, protein or amino acid are represented below in Equations 1 and 2. The anhydride and free carboxylic groups of the synthetic polymers can react with the hydroxyl of the carbohydrate to form ester linkages, and with the amine groups of proteins or amino acids to form amide or imide linkages.

The reaction of a anhydride group on the backbone of a synthetic polymer with a hydroxy group of a carbohydrate to from an ester linkage according to the present invention is as follows (Equation 1):

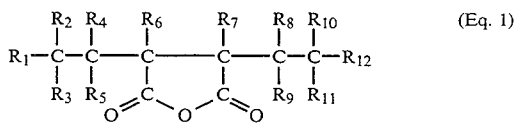

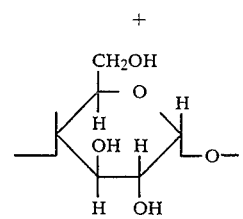

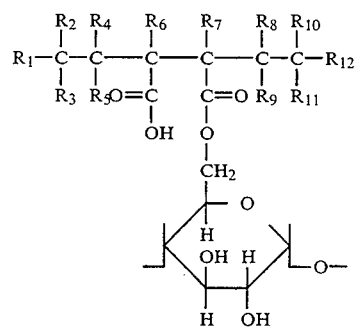

Although Equation 1 shows the reaction at one hydroxyl site on the carbohydrate molecule, the reaction can occur at any hydroxyl site on the carbohydrate molecule. The moieties $R_1$ through $R_{12}$ in Equation 1 can be hydrogen, halogen, alkyl, phenyl, alkoxy, ether, ester, or various other groups.

The reaction equation of an anhydride group on a backbone of a synthetic polymer with an amine group of a protein or amino acid to form an amide or imide linkage is as follows (Equation 2):

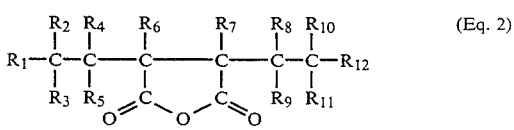

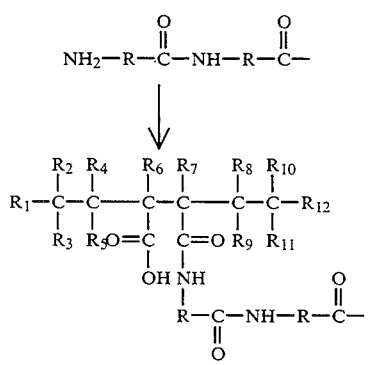

-continued

OR

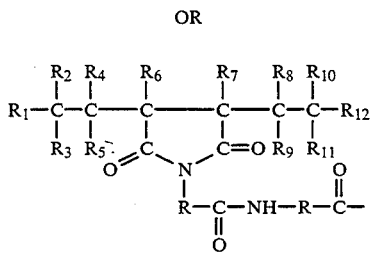

The moieties $R_1$ through $R_{12}$ in Eq. 2 can be hydrogen, halogen, alkyl, phenyl, alkoxy, ether, ester or various other groups.

Examples of general formulas and structures of the reacted components of the biodegradable polymer compositions according to the invention are as follows. A general formula for the reaction product of a synthetic polymer having an anhydride functionality in the backbone, and a carbohydrate is:

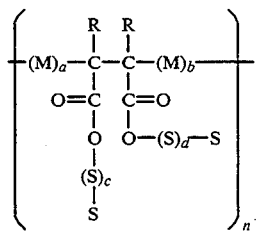

A general formula for the reaction product of a synthetic polymer having a pendent anhydride functionality, and a carbohydrate is:

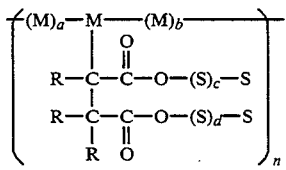

In the above general formulas, M is a monomer unit, such as styrene, ethylene, propylene, vinyl chloride, acrylate, etc., including mixtures thereof and copolymers thereof; R can be hydrogen, halogen, phenyl, alkyl, alkoxy, ether, ester, etc.; S is hydrogen, or a monosaccharide unit; and a, b, c, d, and n can be 0 or greater.

While not wanting to be bound by any theory, we believe that the anhydride and free carboxylic groups of the synthetic polymers react with the hydroxyl group in the carbohydrate to form an ester. The carboxylic group is also capable of forming hydrogen bonds with hydroxyl groups of the carbohydrate.

A general formula for the reaction product of a synthetic polymer having an anhydride functionality in the backbone, and a protein or amino acid to form an amide link is:

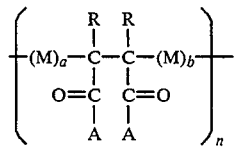

A general formula for the reaction product of a synthetic polymer having a pendent anhydride functionality, and a protein or amino acid to form an amide link is:

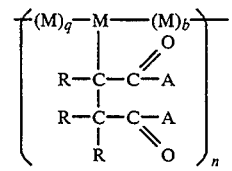

In the above amide link products, M is a monomer unit, such as styrene, ethylene, propylene, vinyl chloride, acrylate, etc., including mixtures thereof and copolymers thereof; R can be hydrogen, halogen, phenyl, alkyl, alkoxy, ether, ester, etc; a, b, and n can be 0 or greater; and A is hydroxy, protein molecule, or amino acid molecule.

A general formula for the reaction product of a synthetic polymer having an anhydride functionality in the backbone, and a protein or amino acid to form an imide link is:

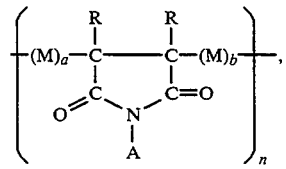

A general formula for the reaction product of a synthetic polymer having a pendent anhydride functionality, and a protein or amino acid to form an imide link is:

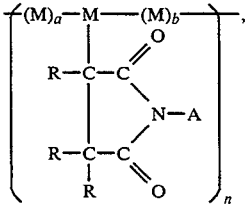

In the above imide link products, M is a monomer unit, such as styrene, ethylene, propylene, vinyl chloride, acrylate, etc., including mixtures thereof and copolymers thereof; R can be hydrogen, halogen, phenyl, alkyl, alkoxy, ether, ester, etc; a, b, and n can be 0 or greater; and A is a protein molecule or amino acid molecule.

Reactive Blending Methods

The biodegradable interpolymer and composition of the invention is made by a process of reactively blending at an elevated temperature a natural polymer such as a polysaccharide compound or a protein compound and a synthetic polymer having functional groups. The process can be done in any reaction vessel suitable for reactive blending. During the process of making the biodegradable interpolymer and composition, the nonbiodegradable synthetic polymer having functional groups has the potential of undergoing a chemical reaction with the natural polymer which can result in covalent and/or physical bonding between the two polymers as described above.

Generally, when immiscible polymers such as natural and synthetic polymers are blended, the resulting mixture is a phase separated system with the major component as the continuous phase and the minor component as the dispersed phase. The mechanical properties of the blend are greatly dependent on the shape and size of the dispersed phase. The other factor contributing to the mechanical strength of the blend is the adhesion between the two phases. The better the adhesion between the phases is, the higher the mechanical strength of the blend. Poor adhesion between the two phases acts as an origin of defect and will lead to subsequent failure of the product blend such as tearing.

Reactive blending of the synthetic and natural polymers according to the present invention produces the chemical or physical bond between a functional group of the synthetic polymer and a hydroxy group or amine group of the natural polymer thereby forming the interpolymer of the invention. For example, the functional group such as an anhydride group reacts with the hydroxy or amine groups from the naturally occurring polymers such as starches or proteins to form covalent bonds or Van der Waal bonds.

The reactive blending method to make the composition of the invention leads to a more uniform and smaller microdomain size of the dispersed phase than in traditional blending techniques, thereby providing for improved bonding between the continuous phase and the dispersed phase. The chemical reaction at the interface of the dispersed phase and continuous phase forms chemical and/or physical bonds between the two phases, thereby increasing the adhesion between the two phases. The formation of physical and chemical bonds between the molecules of the natural and synthetic polymers at the interface of the phases improves the final properties of the blend, such as better adhesion between the phases which provides increased mechanical strength to the composition.

After reactive blending, the natural polymer exhibits less solubility in water because of the chemical reaction in forming the composition of the invention. It is important that the composition of the invention be water insoluble to maintain the mechanical strength and physical integrity of the material until degradation is desirable. Thus, reactive blending offers significant advantages over ordinary traditional blending techniques in producing a mechanically strong biodegradable polymer composition. By the reactive blending process of the invention, it is possible to render immiscible polymer blends compatible whereby the resultant blend properties are synergistic and the morphology of the microdomains (dispersed phase) in the matrix polymer (continuous phase) is finer and more homogeneous.

A method of making a biodegradable interpolymer and composition according to the invention comprises the steps of providing an effective biodegradable amount of a natural polymer such as a carbohydrate or protein compound, or a natural material comprising starch and protein, and mixing at an elevated temperature the natural polymer material with a synthetic polymer containing at least one functional group. The synthetic polymer and natural polymer thereby chemically or physically bond together forming a reactively blended biodegradable interpolymer composition. The synthetic polymer and natural polymer are mixed together at a temperature from about 25° C. to about 300° C., and preferably at a temperature from about 100° C. to about 250° C. By the process of the invention, a biodegradable polymer composition containing up to 99 wt-% of a biodegradable component can be made.

Various additives can be added to the composition of the invention before or during processing. Examples of such additives include adjuvants, fillers, lubricants, mold release agents, plasticizers, foaming agents, stabilizers, pigments, extenders, etc. The additives can be added to the composition singly or in various mixtures.

The mixing of the natural and synthetic polymers can be performed in any reaction type vessel such as an intensive mixer (melt mixer), single screw extruder, twin screw extruder, or an injection molding machine. When mixing in an extruder, the residence time of the material in the extruder during reactive blending is important. Residence times of about 10 seconds to 20 minutes are preferred. The reactively blended composition can then be directly processed to the desired end product or can be pelletized for future use. The composition is in solid form at ambient temperatures after reactive blending is complete, and can be either rigid or flexible depending on the synthetic polymers utilized.

The high shear conditions generated during reactive blending can cause some degradation of the polymers and reduces particle size. However, degradation is not a necessity for the reaction to occur since the reactive functional groups are present to start with. The degraded segments are capable of reacting through the functional groups mentioned above. Thus, a mixture of graft, block and crosslinked structures derived from the nonbiodegradable synthetic and natural biodegradable polymers may be present depending on the number of reactive groups present in the synthetic polymer and on the reaction conditions. The properties of the final biodegradable composition can be changed by changing the nature of the natural and synthetic polymers utilized, the amount of the reactive groups present, and the ratio of degradable to nondegradable polymers.

The final biodegradable interpolymer composition can be further processed by a single screw extruder, twin screw extruder, injection molding machine, compression molding machine, blow molding machine, and other similar devices. Various biodegradable articles can be produced by injection molding, extruding, compression molding, blow molding, or casting the composition of the invention. In a process for producing a biodegradable article by injection molding, extruding, or compression molding the composition of the invention, the process takes place at a temperature of about 100° C. to 250° C., and at a pressure of about 250 psi to 60,000 psi, preferably about 250 psi to 20,000 psi. In a process for producing a biodegradable article by casting or blow molding the biodegradable composition of the invention, the process takes place at a temperature of about 25° C. to 300° C.

Various articles or products which can be formed by the above processing techniques include films, foams, sheets, pipes, rods, bags, boxes, meat trays, egg cartons, hard or foam cups and plates, bowls, eating utensils, loose fill packaging materials, insulation and soundproofing materials, bottles, wrapping materials, disposable pens and razors, packaging cartons, etc. Many areas where plastics are currently being used can utilize the composition of the present invention. The reactive blending of natural polymers such as starch and proteins, along with synthetic polymers having appropriate functional groups offers a way of making a variety of biodegradable articles efficiently for industrial, institutional, and personal usage.

The composition and methods of the invention will be further described in the following working examples, which include a best mode.

WORKING EXAMPLES

The following materials were used in Examples 1–28 below:

(a) High amylose starch, "Amalean-1" supplied by American Maize Products Company, USA.
(b) Industrial corn starch, "Silver Medal Pearl-1100 (SMP-1100)", supplied by Cargill Inc. USA.
(c) Maleated ethylene-propylene copolymer, "Exxelor VA-1801", supplied by Exxon Chemical Company, USA.
(d) Styrene-maleic anhydride copolymer, "Dylark-232" supplied by ARCO Chemical Company, USA.
(e) Isolated soy protein, "Supro HD90" (90% protein), supplied by Protein Technologies International, USA.
(f) Isolated soy protein, "Supro 500E" (90% protein), supplied by Protein Technologies International, USA.
(g) Wheat flour, "ICPS RED" and "ICWRS" (about 20% protein and about 70% starch).

Experimental Procedure

The reactions in the following Examples 1–28 were carried out in a 'Haake' intensive mixer, with the mixer preheated to the indicated temperature. The indicated natural material in powder form, and synthetic polymer granules were weighed in a plastic cup with a press fit lid and the contents were physically mixed by shaking the cup. The speed of the blades in the mixer was adjusted at 50 RPM. The contents of the cup were fed to the mixer through a feeder as quickly as possible. The mixer chamber was then slowly closed with a ram, and a weight of 5 pounds was put on the ram to keep it in place. The mixer stopped after the preset mixing time. The mixer was quickly opened after the reaction and the reaction mixture product was removed with the help of spatula and a pair of forceps. In Examples 1–28, the term "tough" means that the product was flexible after formation, whereas the term "rigid" means that the product was not flexible.

EXAMPLE 1

Into an intensive mixer was placed 43.2 g of dry starch (Amalean-1) and 10.8 g of maleated ethylene-propylene copolymer. These ingredients were then mixed at 180° C. for 10 minutes at 50 RPM. The reaction product was water insoluble and tough.

EXAMPLE 2

Into an intensive mixer was placed 38.5 g of starch (Amalean-1) and 16.5 g of maleated ethylene-propylene copolymer. These ingredients were then mixed at 180° C. for 10 minutes at 50 RPM. The reaction product was water insoluble and tough.

EXAMPLE 3

Into an intensive mixer was placed 33.0 g of dry starch (Amalean-1) and 22.0 g of maleated ethylene-propylene copolymer. These ingredients were then mixed in an intensive mixer at 180° C. for 10 minutes at 50 RPM. The reaction product was water insoluble and tough.

EXAMPLE 4

Into an intensive mixer was placed 40.0 g of dry starch (Amalean-1) and 10.0 g of styrene maleic anhydride copolymer. These ingredients were then mixed in an intensive mixer at 180° C. for 10 minutes at 50 RPM. The reaction product was water insoluble and rigid.

EXAMPLE 5

Into an intensive mixer was placed 38.5 g of dry starch (Amalean-1) and 16.5 g of styrene-maleic anhydride copolymer. These ingredients were then mixed in an intensive mixer at 180° C. for 10 minutes at 50 RPM. The reaction product was water insoluble and rigid.

EXAMPLE 6

Into an intensive mixer was placed 33.0 g of dry starch (Amalean-1) and 22.0 g of styrene-maleic anhydride copolymer. These ingredients were then mixed in an intensive mixer at 180° C. for 10 minutes at 50 RPM. The reaction product was water insoluble and rigid.

EXAMPLE 7

Into an intensive mixer was placed 33.0 g of dry starch (Amalean-1), 11.0 g of styrene-maleic anhydride copolymer and 11.0 g of maleated ethylene-propylene copolymer. These ingredients were then mixed at 180° C. for 10 minutes at 50 RPM. The reaction product was water insoluble and tough.

EXAMPLE 8

Into an intensive mixer was placed 43.2 g of dry corn starch (SMP-1100) and 10.8.g of maleated ethylene-propylene copolymer. These ingredients were then mixed at 180° C. for 10 minutes at 50 RPM. The reaction product was water insoluble and tough.

EXAMPLE 9

Into an intensive mixer was placed 38.5 g of dry corn starch (SMP-1100) and 16.5 g of maleated ethylene-propylene copolymer. These ingredients were then mixed at 180° C. for 10 minutes at 50 RPM. The reaction product was water insoluble and tough.

EXAMPLE 10

Into an intensive mixer was placed 33.0 g of dry corn starch (SMP-1100) and 22.0 g of maleated ethylene-propylene copolymer. These ingredients were then mixed at 180° C. for 10 minutes at 50 RPM. The reaction product was water insoluble and tough.

EXAMPLE 11

Into an intensive mixer was placed 40.0 g of dry corn starch (SMP-1100) and 10.0 g of styrene-maleic anhydride copolymer. These ingredients were then mixed at 180° C. for 10 minutes at 50 RPM. The reaction product was water insoluble and rigid.

EXAMPLE 12

Into an intensive mixer was placed 38.5 g of dry corn starch (SMP-1100) and 16.5 g of styrene-maleic anhydride copolymer. These ingredients were then mixed at 180° C. for 10 minutes at 50 RPM. The reaction product was water insoluble and rigid.

EXAMPLE 13

Into an intensive mixer was placed 33.0 g of dry corn starch (SMP-1100) and 22.0 g of styrene-maleic anhydride copolymer. These ingredients were then mixed at 180° C. for 10 minutes at 50 RPM. The reaction product was water insoluble and rigid.

EXAMPLE 14

Into an intensive mixer was placed 36.6 g of corn starch (SMP-1100@10% moisture) and 22.0 g of maleated ethylene-propylene copolymer. These ingredients were then mixed at 180° C. for 10 minutes at 50 RPM. The reaction product was water insoluble and tough.

EXAMPLE 15

Into an intensive mixer was placed 36.6 g of corn starch (SMP-1100 @10% moisture) and 22.0 g of styrene-maleic anhydride copolymer. These ingredients were then mixed at 180° C. for 10 minutes at 50 RPM. The reaction product was water insoluble and rigid.

EXAMPLE 16

Into an intensive mixer was placed 33.0 g of protein (Supro HD90) and 22.0 g of maleated ethylene-propylene copolymer. These ingredients were then mixed at 180° C. for 10 minutes at 50 RPM. The reaction product was water insoluble and tough.

EXAMPLE 17

Into an intensive mixer was placed 44.0 g of protein (Supro HD90) and 11.0 g of maleated ethylene-propylene copolymer. These ingredients were then mixed at 180° C. for 10 minutes at 50 RPM. The reaction product was water insoluble and tough.

EXAMPLE 18

Into an intensive mixer was placed 33.0 g of protein (Supro HD90) and 22.0 g of maleated ethylene-propylene copolymer. These ingredients were then mixed at 200° C. for 5 minutes at 50 RPM. The reaction product was water insoluble and tough.

EXAMPLE 19

Into an intensive mixer was placed 33.0 g of protein (Supro 500E) and 22.0 g of maleated ethylene-propylene copolymer. These ingredients were then mixed at 180° C. for 10 minutes at 50 RPM. The reaction product was water insoluble and tough.

EXAMPLE 20

Into an intensive mixer was placed 33.0 g of wheat flour (ICPS RED) and 22.0 g of maleated ethylene-propylene copolymer. These ingredients were then mixed at 180° C. for 10 minutes at 50 RPM. The reaction product was water insoluble and tough.

EXAMPLE 21

Into an intensive mixer was placed 44.0 g of wheat flour (ICPS RED) and 11.0 g of maleated ethylene-propylene copolymer. These ingredients were then mixed at 180° C. for 10 minutes at 50 RPM. The reaction product was water insoluble and tough.

EXAMPLE 22

Into an intensive mixer was placed 33.0 g of wheat flour (ICWRS) and 22.0 g of maleated ethylene-propylene copolymer. These ingredients were then mixed at 180° C. for 10 minutes at 50 RPM. The reaction product was water insoluble and tough.

EXAMPLE 23

Into an intensive mixer was placed 33.0 g of protein (Supro HD90) and 22.0 g of styrene-maleic anhydride copolymer. These ingredients were then mixed at 180° C. for 10 minutes at 50 RPM, The reaction product was water insoluble and rigid.

EXAMPLE 24

Into an intensive mixer was placed 44.0 g of protein (Supro HD90) and 11.0 g of styrene-maleic anhydride copolymer, These ingredients were then mixed at 180 ° C. for 10 minutes at 50 RPM, The reaction product was water insoluble and rigid.

EXAMPLE 25

Into an intensive mixer was placed 33.0 g of protein (Supro 500E) and 22.0 g of styrene-maleic anhydride copolymer, These ingredients were then mixed at 180° C. for 10 minutes at 50 RPM, The reaction product was water insoluble and rigid.

EXAMPLE 26

Into an intensive mixer was placed 33.0 g of wheat flour (ICPS RED) and 22.0 g of styrene-maleic anhydride copolymer, These ingredients were then mixed at 180° C. for 10 minutes at 50 RPM, The reaction product was water insoluble and rigid.

EXAMPLE 27

Into an intensive mixer was placed 44.0 g of wheat flour (ICPS RED) and 11.0 g of styrene-maleic anhydride copolymer, These ingredients were then mixed at 180° C. for 10 minutes at 50 RPM, The reaction product was water insoluble and rigid,

EXAMPLE 28

Into an intensive mixer was placed 33.0 g of wheat flour (ICWRS) and 22.0 g of styrene-maleic anhydride copolymer. These ingredients were then mixed at 180° C. for 10 minutes at 50 RPM. The reaction product was water insoluble and rigid.

Once the blended compositions of the above Examples were removed from the mixer, samples were molded into rectangular strips by pressing the composition in a mold at a constant force at a preset temperature (180°–200° C.) for a fixed period of time (10 minutes). The platens were then cooled with water while maintaining the force until the temperature fell below 40° C., after which the sample was removed and stored for further analysis. Samples of the above prepared Examples were tested for tensile strength and water absorption as described below.

Tensile Strength Test

Procedure: Tensile tests of various samples of the above Examples were performed on an "Instron" tensile testing machine. Rectangular strips measuring about 60 mm by 10 mm by 2mm were molded by compression molding. The exact dimensions of the specimens were measured before the test. The specimens were mounted in the grips of the machine and stretched at a constant crosshead speed. The load was continuously recorded. The tensile strength was calculated from the maximum load before the failure and the cross section area of the sample. The cross head speed was fixed at 2 mm/min and at 5 mm/min for polystyrene and poly(ethylene-propylene) based compositions respectively. The tensile strength of selected Examples is listed below in Table I.

TABLE I

Tensile Strength

| Example | Sample | Natural Polymer % | Tensile Strength psi |
|---|---|---|---|
| Example 1 | High amylose starch + poly(ethylene-propylene) | 80 | 1018 |
| Example 2 | High amylose starch + poly(ethylene-propylene) | 70 | 835 |
| Example 3 | High amylose starch + poly(ethylene-propylene) | 60 | 598 |
| Example 5 | High amylose starch + polystyrene | 70 | 3040 |
| Example 6 | High amylose starch + polystyrene | 60 | 3755 |
| Example 7 | High amylose starch + polystyrene (20%) + poly(ethylene-propylene) (20%) | 60 | 783 |
| Example 8 | Industrial corn starch + poly(ethylene-propylene) | 80 | 788 |
| Example 10 | Industrial corn starch + poly(ethylene-propylene) | 60 | 952 |
| Example 11 | Industrial corn starch + polystyrene | 80 | 1009 |
| Example 13 | Industrial corn starch + polystyrene | 60 | 2534 |
| Example 16 | Protein HD90 + poly(ethylene-propylene) | 60 | 926 |
| Example 17 | Protein HD90 + poly(ethylene-propylene) | 80 | 654 |
| Example 19 | Protein 500E + poly(ethylene-propylene) | 60 | 880 |
| Example 20 | Wheat flour ICPS RED + poly(ethylene-propylene) | 60 | 1012 |
| Example 21 | Wheat flour ICPS RED + poly(ethylene-propylene) | 80 | 983 |
| Example 23 | Protein HD90 + polystyrene | 60 | 3085 |
| Example 24 | Protein HD90 + polystyrene | 80 | 3185 |
| Example 25 | Protein 500E + polystyrene | 60 | 2566 |
| Example 26 | Wheat flour ICPS RED + polystyrene | 60 | 2412 |
| Example 27 | Wheat flour ICPS RED + polystyrene | 80 | 2720 |
| Example 28 | Wheat flour ICWRS + polystyrene | 60 | 2584 |

Water Absorption Test

Procedure: Large chunks of polymers of the above Examples weighing between 4 and 5 g were immersed in water. The samples were then removed from water, lightly blotted with a tissue paper and weighed for water absorption. All of the samples were insoluble in cold and boiling water. The samples turned somewhat softer after being immersed in water, but did not lose their mechanical integrity. The actual values of absorptions were dependent on the physical form and the surface area of the sample. As can be seen in Table II below, samples with the highest percent of natural polymer (80%) had the greatest water absorption after one day and 9 days.

TABLE II

Water Absorption

| Example | Sample | Natural Polymer % | Absorption after 1 day % | Absorption after 9 days % |
|---|---|---|---|---|
| Example 1 | High amylose starch + poly(ethylene-propylene) | 80 | 33.97 | 69.08 |
| Example 2 | High amylose starch + poly(ethylene-propylene) | 70 | 2.06 | 4.44 |
| Example 3 | High amylose starch + poly(ethylene-propylene) | 60 | 1.95 | 4.20 |
| Example 4 | High amylose starch + polystyrene | 80 | 26.66 | 50.94 |
| Example 5 | High amylose starch + polystyrene | 70 | 5.89 | 14.82 |
| Example 6 | High amylose starch + polystyrene | 60 | 4.63 | 10.70 |
| Example 7 | High amylose starch + polystyrene (20%) + poly(ethylene-propylene) (20%) | 60 | 4.13 | 9.80 |
| Example 8 | Industrial corn starch + poly(ethylene-propylene) | 80 | 7.26 | 13.81 |
| Example 9 | Industrial corn starch + poly(ethylene-propylene) | 70 | 1.56 | 3.63 |
| Example 10 | Industrial corn starch + poly(ethylene-propylene) | 60 | 1.65 | 3.58 |
| Example 11 | Industrial corn starch + polystyrene | 80 | 22.58 | 36.59 |
| Example 13 | Industrial corn starch + polystyrene | 60 | 6.81 | 15.52 |
| Example 16 | Protein HD90 + poly(ethylene-propylene) | 60 | 3.4 | 9.77 |
| Example 17 | Protein HD90 + poly(ethylene-propylene) | 80 | 10 | 25.68 |
| Example 19 | Protein 500E + poly(ethylene-propylene) | 60 | 8.76 | 22.55 |
| Example 20 | Wheat flour ICPS RED + poly(ethylene-propylene) | 60 | 2.1 | 5.41 |
| Example 21 | Wheat flour ICPS RED + poly(ethylene-propylene) | 80 | 5.5 | 13.36 |
| Example 22 | Wheat flour ICWRS + poly(ethylene-propylene) | 60 | 2.4 | 6.46 |
| Example 23 | Protein HD90 + polystyrene | 60 | 6 | 16.34 |
| Example 24 | Protein HD90 + polystyrene | 80 | 11.8 | 30.87 |
| Example 25 | Protein 500E + polystyrene | 60 | 9 | 21.6 |
| Example 26 | Wheat flour ICPS RED + polystyrene | 60 | 4.25 | 13.77 |
| Example 27 | Wheat flour ICPS RED + polystyrene | 80 | 9.2 | 24.78 |
| Example 28 | Wheat flour ICWRS + polystyrene | 60 | 4.24 | 13.67 |

As can be understood from the above description and Examples, the biodegradable polymer composition of the invention and the method of making it have several advantages, such as: (1) the biodegradable polymer is less expensive than other biodegradable polymers, (2) the biodegradable polymer retains its physical characteristics even when a large percentage of natural polymer such as a carbohydrate is used; (3) the biodegradable polymer effectively degrades when discarded; and (4) the process of the invention permits the inclusion of a larger amount of natural polymer such as a carbohydrate in combination with a synthetic polymer than previously possible.

The foregoing discussion and examples are illustrative of the invention. However, since many embodiments of the invention can be made without departing from the spirit and scope of the invention, the invention resides wholly in the claims hereinafter appended.

What is claimed is:

1. A biodegradable interpolymer comprising:
   (a) a continuous phase, said continuous phase being a major component; and
   (b) a dispersed phase, said dispersed phase being a minor component;
   wherein the major component and the minor component are physically or chemically bonded at an interface between the continuous phase and the dispersed phase providing a strong interaction between the continuous phase and the dispersed phase; wherein one of said components is a protein compound and the other component is a synthetic polymer having at least one functional group; and wherein said protein compound is present in the interpolymer in an effective biodegradable amount.

2. The interpolymer of claim 1 wherein said protein compound is selected from the group consisting of egg proteins, milk proteins, animal proteins, vegetable proteins and cereal proteins.

3. The interpolymer of claim 1 wherein said synthetic polymer is selected from the group consisting of polystyrene, polyethylene, polypropylene, polyvinyl chloride, polyesters, polyamides, polyacrylates, polyurethanes, polyurea, polyethers, polybutadiene, polyisoprene, saturated dienes, rubbers, polycarbonates, polylactides, random and block and graft copolymers of the aforementioned polymers, and mixtures of the above polymers.

4. The interpolymer of claim 1 wherein said functional group is selected from the group consisting of primary amines, secondary amines, tertiary amines, epoxy, hydroxy, carboxyl, alkyl halides, oxazoline, anhydrides, isocyanate, nitrile, nitro, acyl halides, alkoxy, aldehydes, ketones, thiols, esters, amides, ethers, urethanes, carbodiimide, and urea.

5. The interpolymer of claim 1 wherein said synthetic polymer is a maleated ethylene-propylene copolymer or a styrene-maleic anhydride copolymer.

6. A biodegradable interpolymer composition comprising:
   (a) a protein compound in an amount of about 5 to 99 wt-%; and
   (b) a synthetic polymer in an amount of about 1 to 95 wt-%, said synthetic polymer having at least one functional group;
   wherein one of said components (a) and (b) is present in the composition as a continuous phase and is a major component and the other component is a dispersed phase and is a minor component, said protein compound and said synthetic polymer being chemically or physically bonded at an interface between the continuous phase and the dispersed phase, thereby forming a plurality of interpolymers which effectively provide a strong interaction between the continuous phase and the dispersed phase.

7. The composition of claim 6 wherein said functional group of said synthetic polymer reacts with an amine group of said protein compound, thereby covalently bonding said synthetic polymer to said protein compound at the interface between the continuous phase and the dispersed phase.

8. The composition of claim 6 wherein said protein compound is selected from the group consisting of egg proteins, milk proteins, animal proteins, vegetable proteins and cereal proteins.

9. The composition of claim 6 wherein said synthetic polymer is selected from the group consisting of polystyrene, polyethylene, polypropylene, polyvinyl chloride, polyesters, polyamides, polyacrylates, polyurethanes, polyurea, polyethers, polybutadiene, polyisoprene, saturated dienes, rubbers, polycarbonates, polylactides, random and block and graft copolymers of the aforementioned polymers, and mixtures of the above polymers.

10. The composition of claim 6 wherein said functional group is selected from the group consisting of primary amines, secondary amines, tertiary amines, epoxy, hydroxy, carboxyl, alkyl halides, oxazoline, anhydrides, isocyanate, nitrile, nitro, acyl halides, alkoxy, aldehydes, ketones, thiols, esters, amides, ethers, urethanes, carbodiimide, and urea.

11. A biodegradable composition made by a process comprising reactively blending at an elevated temperature a protein compound and a synthetic polymer having at least one functional group, wherein either the protein compound or the synthetic polymer is present in the composition as a continuous phase and is a major component and the other component not present in the compound as a continuous phase is a dispersed phase and is a minor component, and wherein the protein compound and synthetic polymer are reactively blended in such a manner that the protein compound and the synthetic polymer are chemically or physically bonded at an interface between the continuous phase and the dispersed phase; said bond providing a strong interaction between the continuous phase and the dispersed phase.

12. A method of making a biodegradable interpolymer composition which comprises the steps of:
   (a) providing an effective biodegradable amount of a protein compound; and
   (b) mixing at an elevated temperature said protein compound with a synthetic polymer containing at least one functional group;
   wherein said synthetic polymer and said protein compound chemically or physically bond together, thereby forming a reactively blended biodegradable interpolymer composition; wherein the reactively blended biodegradable interpolymer composition comprises a continuous phase and a dispersed phase and wherein the protein compound and the synthetic polymer are chemically or physically bonded at an interface between the continuous phase and the dispersed phase in such a manner that a strong interaction between the continuous phase and the dispersed phase is provided.

13. The method of claim 12 wherein said synthetic polymer and said protein compound are mixed together at a temperature from about 25° C. to about 300° C.

14. A biodegradable article produced by injection molding, extruding, or compression molding the biodegradable interpolymer composition of claim 6.

15. A process for producing a biodegradable article by injection molding, extruding, or compression molding the composition of claim 6 at a temperature of about 100° C. to 250° C. and at a pressure of about 250 psi to 60,000 psi.

16. A biodegradable article produced by casting or blow molding the biodegradable interpolymer composition of claim 6.

17. A process for producing a biodegradable article by casting or blow molding the composition of claim 6 at a temperature of about 25° C. to 300° C.

18. A biodegradable interpolymer composition comprising:
   (a) a natural material comprising protein and starch in an amount of about 5 to 99 wt-%; and
   (b) a synthetic polymer in an amount of about 1 to 95 wt-%, said synthetic polymer having at least one functional group;
   wherein said components (a) and (b) are present in the composition as a continuous phase if it is a major component or as a dispersed phase if it is a minor component, said natural material and said synthetic polymer being chemically or physically bonded at an interface between the continuous phase and the dispersed phase, thereby forming a plurality of interpolymers which effectively provide a strong interaction between the continuous phase and the dispersed phase.

19. The composition of claim 18 wherein said natural material is wheat flour.

20. A biodegradable composition made by a process comprising reactively blending at an elevated temperature a natural material comprising starch and protein, and a synthetic polymer having at least one functional group, thereby producing a chemical or physical bond between the natural material and the synthetic polymer; wherein the biodegradable composition comprises a dispersed phase and a continuous phase and wherein the natural material and the synthetic polymer are chemically or physically bonded at an interface between the continuous phase and the dispersed phase in such a manner that a strong interaction between the continuous phase and the dispersed phase is provided.

21. A method of making a biodegradable interpolymer composition which comprises the steps of:
   (a) providing an effective biodegradable amount of a natural material comprising starch and protein; and
   (b) mixing at an elevated temperature said natural material with a synthetic polymer containing at least one functional group;
   wherein said synthetic polymer and said protein compound chemically or physically bond together, thereby forming a reactively blended biodegradable interpolymer composition; wherein the reactively blended biodegradable interpolymer composition includes a dispersed phase and a continuous phase, and wherein the natural material and the synthetic polymer are chemically or physically bonded at an interface between the continuous phase and the dispersed phase thereby providing a strong interaction between the continuous phase and the dispersed phase.

* * * * *

UNITED STATES PATENT AND TRADEMARK OFFICE
CERTIFICATE OF CORRECTION

PATENT NO. : 5,446,078

DATED : August 29, 1995

INVENTOR(S) : Utpal R. Vaidya, Mrinal Bhattacharya

It is certified that error appears in the above-identified patent and that said Letters Patent is hereby corrected as shown below:

Column 7, Lines 22-34

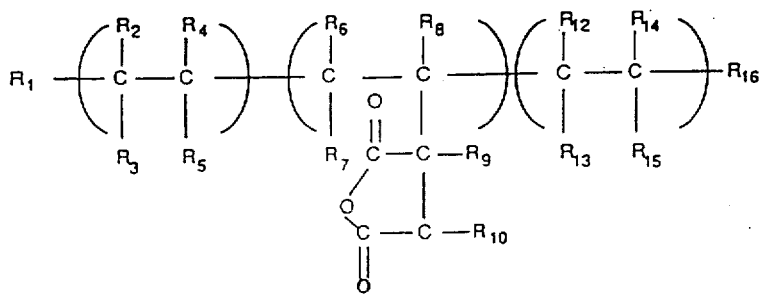

Should read

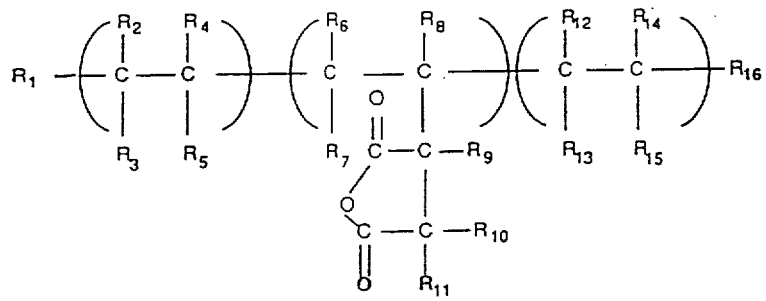

Column 10, line 14, insert --(M)-- before the formula.

UNITED STATES PATENT AND TRADEMARK OFFICE
CERTIFICATE OF CORRECTION

PATENT NO. : 5,446,078

DATED : August 29, 1995

INVENTOR(S) : Utpal R. Vaidya, Mrinal Bhattacharya

It is certified that error appears in the above-identified patent and that said Letters Patent is hereby corrected as shown below:

Column 8, Lines 3-23

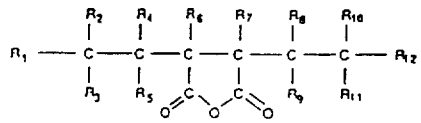

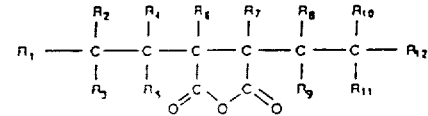

should read

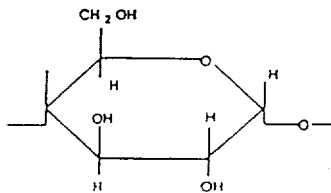

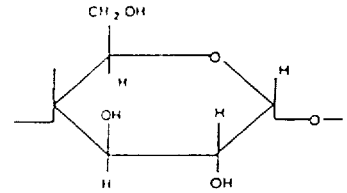

+

Signed and Sealed this

Twelfth Day of March, 1996

Attest:

BRUCE LEHMAN

Attesting Officer   Commissioner of Patents and Trademarks